United States Patent
Kolbert

[11] Patent Number: 6,105,253
[45] Date of Patent: Aug. 22, 2000

[54] HEDGE TRIMMER

[76] Inventor: Stephen R. Kolbert, 540 Paradise Rd., East Amherst, N.Y. 14051-1733

[21] Appl. No.: 09/413,087

[22] Filed: Oct. 6, 1999

[51] Int. Cl.$^7$ .................................................... A01D 34/71
[52] U.S. Cl. .............................. 30/124; 30/276; 30/296.1; 56/13.1
[58] Field of Search ......................... 30/124, 276, 296.1; 56/13.3, 12.7, 13.1

[56] References Cited

U.S. PATENT DOCUMENTS

| | | | |
|---|---|---|---|
| Re. 29,139 | 2/1977 | Messner | 56/13.1 |
| 1,579,783 | 4/1926 | Ross | 30/296.1 |
| 2,091,827 | 8/1937 | Mercatoris | 30/276 |
| 2,697,457 | 12/1954 | Lawrence | 30/228 |
| 3,546,865 | 12/1970 | Woodward | 30/296.1 |
| 4,641,431 | 2/1987 | Leming et al. | 30/276 |
| 5,210,996 | 5/1993 | Fassauer | 56/12.8 |
| 5,588,289 | 12/1996 | Wilson | 56/13.1 |
| 5,862,595 | 1/1999 | Keane | 30/124 |
| 6,014,812 | 1/2000 | Webster | 30/276 |

*Primary Examiner*—Hwei-Siu Payer
*Attorney, Agent, or Firm*—James J. Ralabate

[57] ABSTRACT

A hedge trimmer of this invention is very lightweight and efficient. It has a very large clipping collection bag that has a capacity much larger than any known user-worn device of this type. The blades and guard are designed to pull and maintain the clippings in the system.

12 Claims, 4 Drawing Sheets

HEDGE TRIMMER

BACKGROUND OF THE INVENTION

There are known various cutters to be used for grass or hedge trimming. Some of these devices even collect the trimmings after the cutting operation. Most of the hedge trimmers are relatively cumbersome to operate; some are heavy and others have limited trimming retention capacity. Some of these devices are disclosed in U.S. Pat. Nos. 2,153,771; 4,361,001; 5,357,736; 5,588,289; and 5,862,595.

In U.S. Pat. No. 2,153,771 (Orr) a grass cutter and hedge trimmer is disclosed that has a knife with blades formed with opposite cutting edges of identical formation so that one side of the blade will not cut more material than the other. The cutting mechanism and hood are connected to an elongated handle which will move depending upon the angle of the hood or skirt 6. There is no accommodation made in Orr for the collection of cuttings or trimmings after the cutting operation. Also it would be difficult to hold the Orr device when trimming hedges or shrubbery.

In Ahnond U.S. Pat. No. 4,361,001 a lawn mower is disclosed. In this prior art patent, a hover-type lawn mower is provided with a cover which fits over the shroud or housing for the rotatable blade. The cover is provided with openings so that the air flow therethrough forms an air cushion and also transports cut grass and leaves to a collecting area in the cover. The cover is further provided with releasable fastening means to the shroud, so that the cover can be removed when it is desired to empty the collected cut grass and leaves therein. Almond does provide for collection of debris; however, the collection area of Almond is very limited and not very practical for relatively large hedge trimmings.

The Thomas patent U.S. Pat. No. 5,357,736 discloses a lawn mower with grass collection means; this device is not a practical cutter for hedges and the like. Thomas described his device as a lawn mower of the type which collects grass cuttings which includes a motor driven blade rotatable about a substantially vertical axis, at least one fan rotatable about the same axis, and a grass collecting system of the type in which grass collection is aided by suction from an airstream produced by the fan. It includes a closure which is selectively adjustable to at least two positions; one in which a grass collection aperture in a grass box is closed and a debris collection aperture in the grass box is open, and the other in which the grass collection aperture is open and the debris collection aperture is closed. A second embodiment includes a closure which is selectively adjustable to at least two positions; one in which both the grass collection aperture and the debris collection aperture are open, and the other in which only the grass collection aperture is open. Thomas' device is too heavy and too cumbersome to use as a hand-held hedge trimmer.

U.S. Pat. No. 5,588,289 (Wilson) discloses a cutting tool for gardens and workshops that has a driven impeller to accommodate transporting clippings from a cutting area to a collection means. The distance the clippings must travel in the Wilson device is substantial, thereby allowing clipping clogging possibilities to be high. Also, the device is relatively heavy with a motor in the cutting body A and a motor located in the back pack as shown in Wilson's FIG. 12. The device is heavy, complicated, somewhat expensive, and could be difficult because of its weight to wear and use for any extended period of time.

Keane U.S. Pat. No. 5,862,595 discloses a hand-holdable trimmer for garden and lawn applications that has a relatively long elongated housing defining an air passage extending from the trimmer's rotating trimmer head to a collection container for cuttings mounted distally on the housing. An impeller wheel driven by the trimmer motor causes air to flow under positive pressure from the region surrounding the trimmer head through the housing air passage to eventually deliver the trimmer cuttings to the collection container. A dual, axially adjustable trimmer head assembly also is provided to more efficiently cut grass, weeds, etc. into small pieces capable of being transferred to the collection container. Keane uses a flexible string as the cutting means and requires a long conduit from cutting means to collection means thereby increasing the possibility of clogging of especially coarse hedge trimmings therein.

SUMMARY OF THE INVENTION

It is therefore an object of this invention to provide a novel hedge trimmer devoid of the above noted disadvantages.

Another object of this invention is to provide a lightweight relatively simple hedge trimmer with an uncomplicated construction.

Still a further object of this invention is to provide a hedge trimmer that collects trimmings in a relatively large capacity collection means.

Yet another object of this invention is to provide a hedge trimmer where the possibility of clogging is held to a minimum.

Another still further object of this invention is to provide a hedge trimmer where the blades are constructed to direct trimmings upward into the collection means.

Yet, another object of this invention is to provide a hedge trimmer having a guard around the blades to protect the blades and also to assist in directing the trimmings into a collection housing.

These and other objects of the invention are accomplished, generally speaking, by a hedge trimmer having a hood which housing the cutting blades and blade guard. Attached to the roof of the hood is an opening which immediately abuts a collection bag so that no elongated conduit is needed along which trimmings must travel. The collection bag has a strap that fits over the shoulder of the user and allows a large collection bag to be easily supported by the user. Connected to the hood also is a handle having at one end a handle bar extending therefrom, and at the opposite end a second handle grip for easy supporting of the hedge trimmer. The terminal end of the handle has an electric cord for connection to an electrical outlet. Obviously, a battery can be used in place of the electrical cord and electrical outlet as a source of power. The blades which are housed in the hood are designed to mulch and force the trimmings upward into the collection bag; because of the air stream created by the blades, no vacuum means are needed to pull the clippings into the bag. The blade assembly upon rapid rotation creates an air stream under the hood by drawing air from the underside of the hood and pulling or directing the clippings into the collection bag.

DETAILED DESCRIPTION OF THE DRAWING AND PREFERRED EMBODIMENTS

Figure 1:
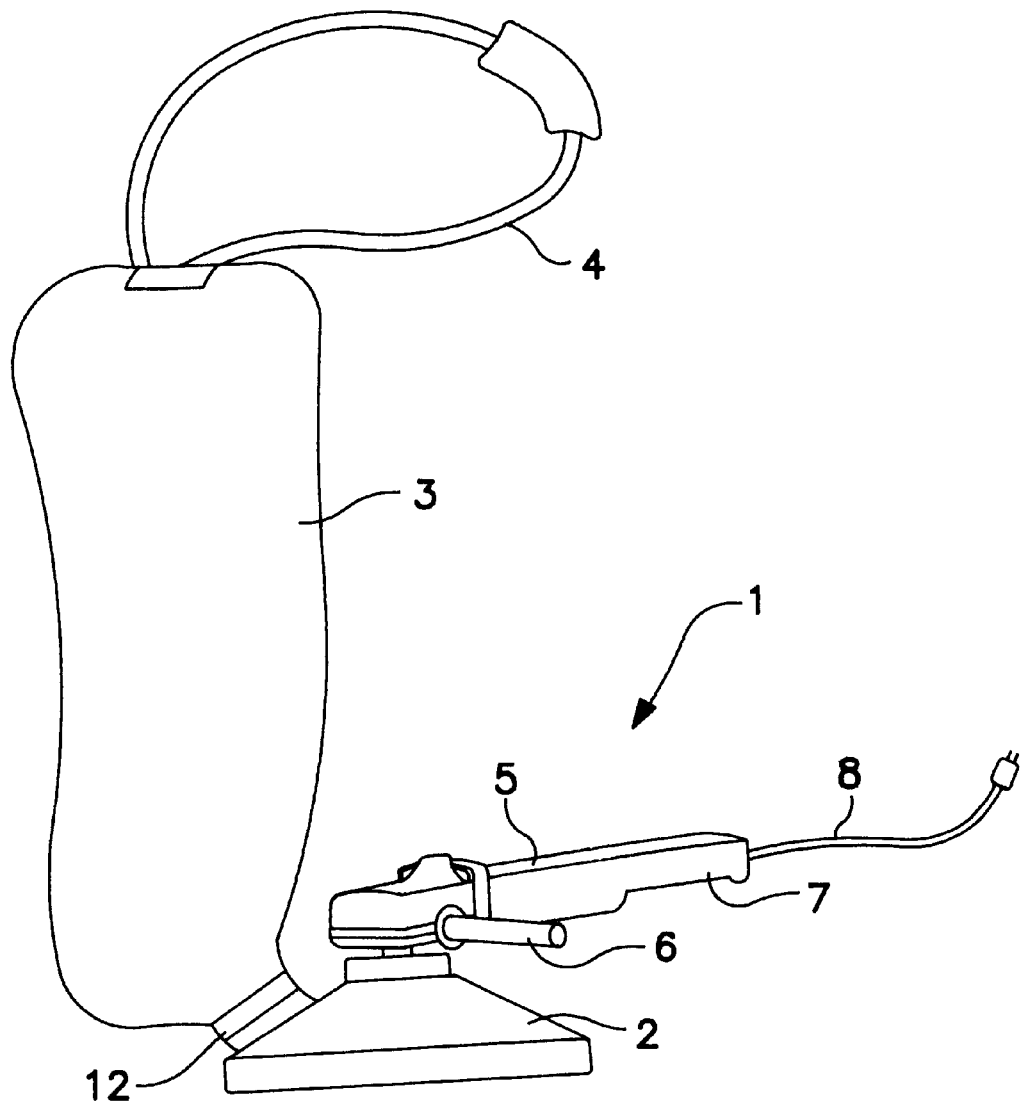
FIG. 1 is a perspective top front view of the entire hedge trimming system of this invention.
Figure 2:
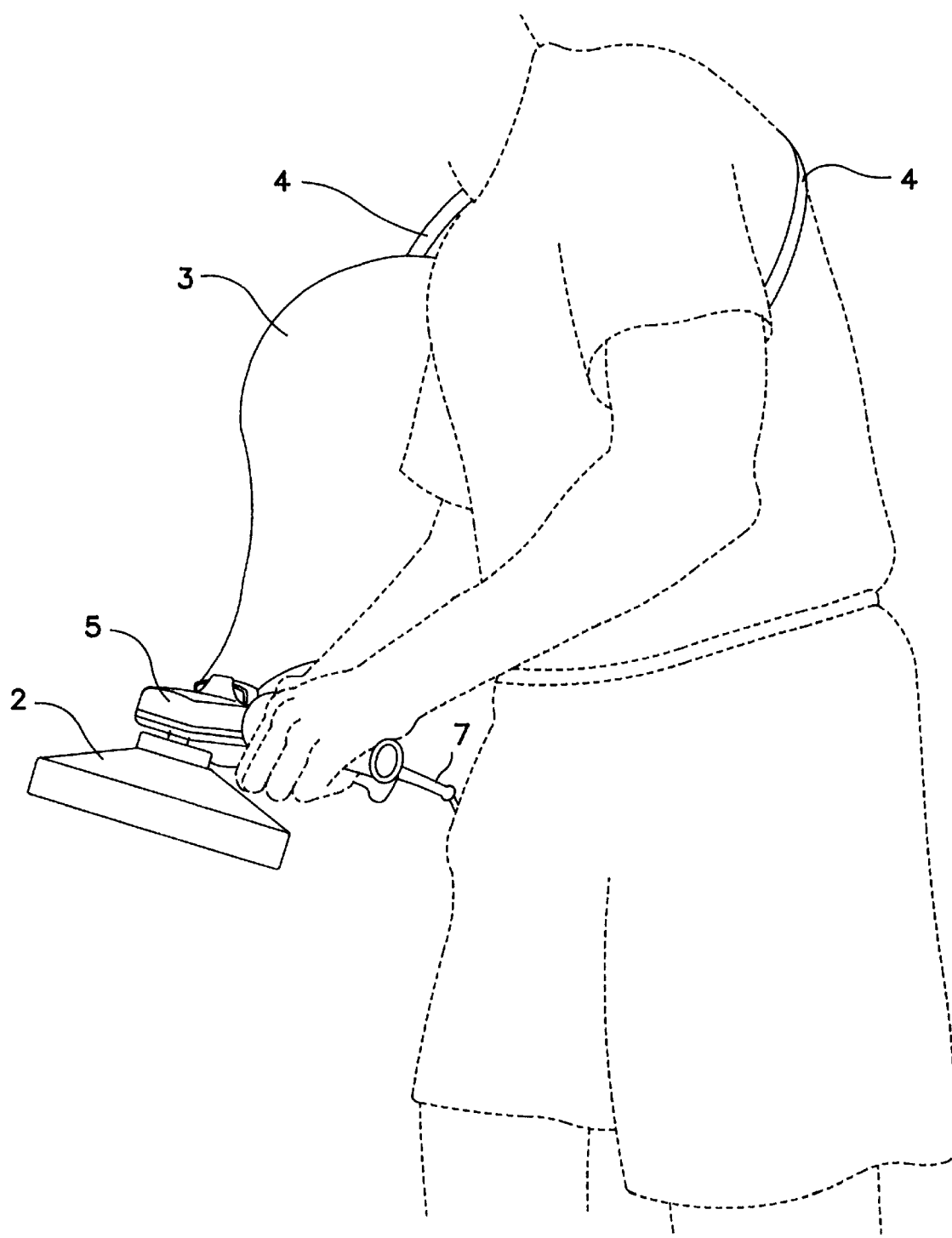
FIG. 2 is a perspective view of the hedge trimmer of this invention in operation while being worn with the bag supported by the user.
Figure 3:
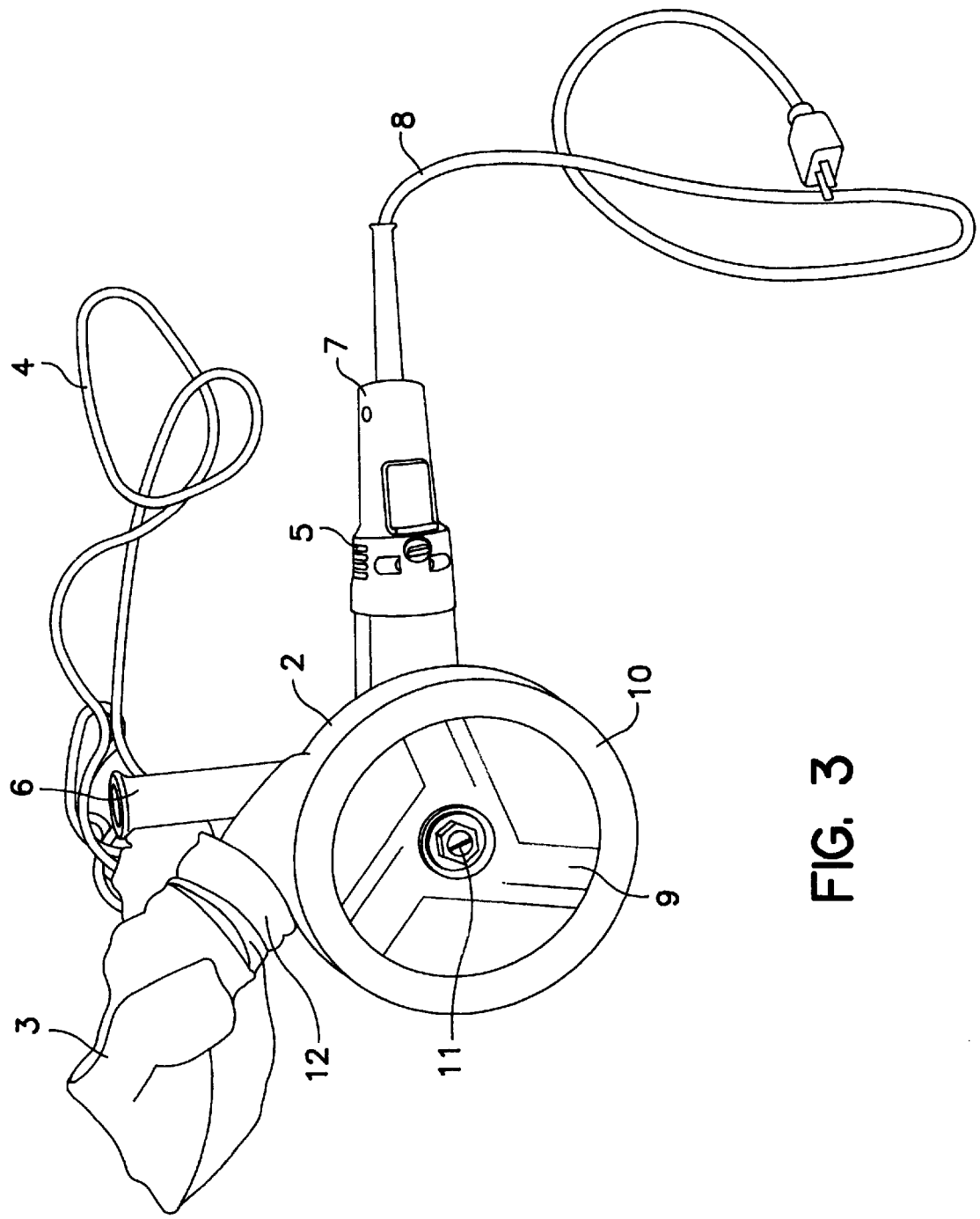
FIG. 3 is a bottom perspective view of the hedge trimmer of this invention.
Figure 4:
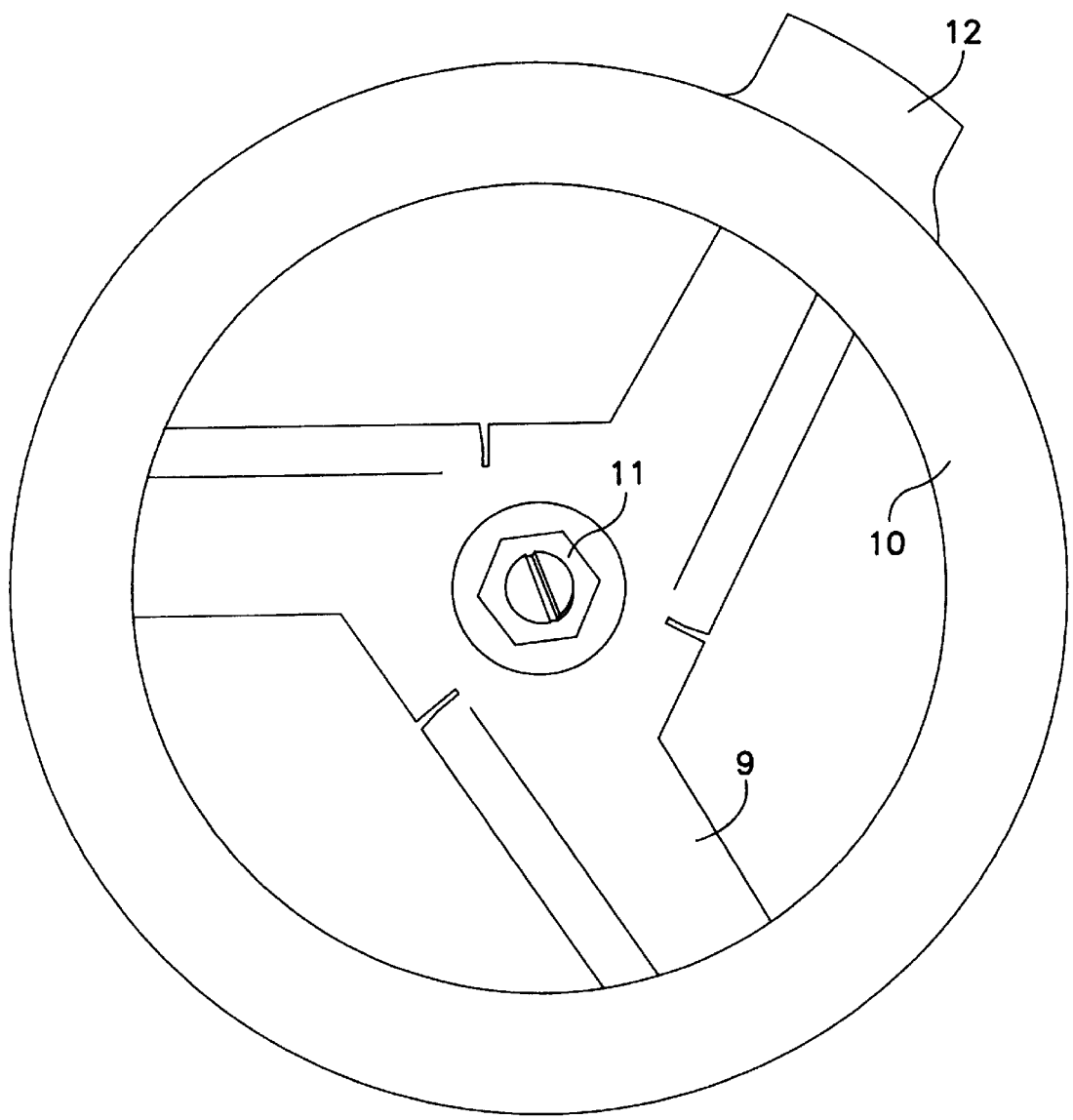
FIG. 4 is a bottom plan view of the cutting mechanism of the hedge trimmer of this invention.

In FIGS. 1 and 2 the entire hedge trimmer device 1 of this invention is illustrated. The device 1 comprises a hood 2 which houses the cutting mechanism, a collection bag 3 which collects the trimmings, a shoulder strap 4 for wearing use by the user to support the collection bag 3, and a handle means 5 attached to the hood 2 for holding the trimmer and directing the cutting means to the desired location. In use, the user positions the strap 4 over his or her shoulders, holds the handle bar 6 with his or her left hand, grasps the end handle 7 with the right hand and the device 1 is ready for use. Obviously, the electric power by cord 8 or battery needs to be present for the unit to be operational. If other power means such as gasoline or others are desirable, the device 1 can easily be adapted for such power use. The device 1 is very simply constructed, very light weight, effective, and most importantly, with a clog-free system to collect trimmings. Also, because the bag 3 is supported by the user, a substantially larger capacity collection means than previously available is provided. The hood 2 houses the blades 9, as shown in FIG. 4. The bottom portion of hood 2 has an overlapping ridge 10 around the entire circumference of the bottom section of hood 2. This ridge 10 is tapered upwardly toward the center of the rotary 11 to keep the clippings in the housing and also for safety reasons. By "upwardly" is meant a derivation when the unit 1 is lying on a flat horizontal support, that approaches the hood 2. It is very important to the invention to have this protective ridge 10 in the device because it assists in the vacuum action caused by the rotation of blade 9 and because it protects both the user and blades 9 from debris. The blades are constructed with beveled edges in order to easily mulch and force the clippings upward into the collection bag 3. The rotary 11 is connected to the power means 8 in any conventional manner, as is known in the prior art. It is critical to the present invention that the bag 3 be immediately adjacent the hood 2 and has a very "wide" connector 12 to prevent any possible clogging of the clippings in the system. By "wide" is meant throughout this disclosure as an opening having a diameter at least equal to or greater than ½ the radius of hood 2, as shown in FIG. 1. The bag 3 is easily connected and removed from hood 2 by connector 12, which is very wide to provide for a wide opening into bag 3. FIG. 3 is a bottom view of trimmer 1 illustrating the beveled ridge 10 around the bottom of the hood 2. Also evident from this figure is the small size and light weight provided by the present invention.

The preferred and optimumly preferred embodiments of the present invention have been described herein and shown in the accompanying drawings to illustrate the underlying principles of the invention, but it is to be understood that numerous modifications and ramifications may be made without departing from the spirit and scope of this invention.

What is claimed is:

1. A portable hedge trimmer comprising in combination a source of power, a conical hood which houses a rotary and a cutting blade assembly, an exit opening in a top roof section of said hood which opens into a collection vessel, an attachment means connected to said collection vessel having means for connection to a user, and a handle means connected to said hood, said handle means having at least two hand gripping portions, said collection vessel supported by the user and having means to provide an enlarged collection capacity, and wherein said conical hood has a lower open section, said lower open section containing an overlapping ridge around the entire circumference of said lower open section, said overlapping ridge being tapered upwardly toward said rotary.

2. The hedge trimmer of claim 1 wherein said hood has a conical shape with said roof section, and a lower open section, said lower open section adapted to provide contact of said blade assembly with vegetation to be trimmed.

3. The hedge trimmer of claim 1 wherein said hood houses said rotary connected to said source of power, said rotary means having attached thereto at least two blades, each blade having means to mulch and force trimmings into said hood and said collection vessel.

4. The hedge trimmer of claim 1 wherein said collection vessel is an oversized collection bag with said attachment means supported around the torso of user and which has means to be removed from said hood.

5. The hedge trimmer of claim 1 wherein said cutting blade assembly comprises three separate blade sections connected at their inner terminal portion and attached to said rotary, each of said blade sections having means to mulch and force trimmings into said hood.

6. The hedge trimmer of claim 1 wherein said collection vessel has connected thereto said means for connection said attachment means comprising a strap or cord for attachment to a user whereby the collection vessel is fully supported by said user.

7. A portable hedge trimmer having in combination a handle means, a conical hood, a source of power, a cutting blade assembly comprising a rotary and cutting blades, and a user wearable collection vessel, said conical hood housing said cutting blade assembly and having a roof and a lower open section, said handle means connected to said hood and having at least two hand gripping portions, said roof having an enlarged exit opening in contact with said collection vessel, said exit opening providing means for debris to pass from said conical hood to said collection vessel, and wherein said lower open section containing an overlapping ridge around the entire circumference of said lower open section, said overlapping ridge being tapered upwardly toward said rotary.

8. The hedge trimmer of claim 7 wherein said hood has a conical shape with said roof, said lower open section adapted to provide contact of said blade assembly with vegetation to be trimmed.

9. The hedge trimmer of claim 7 wherein said hood houses said rotary connected to said source of power, said rotary having attached thereto said cutting blades, each blade having means to mulch and force trimings into said hood and said collection vessel.

10. The hedge trimmer of claim 7 wherein said collection vessel is an oversized collection bag with means supported around a torso of a user and which has means to be removed from said hood.

11. The hedge trimmer of claim 7 wherein said cutting blade comprise three separate blade sections connected at their inner terminal portion and attached to said rotary, each of said blade sections having means to mulch and force trimmings into said hood.

12. The hedge trimmer of claim 7 wherein said collection vessel has connected thereto attachment means, said attachment means comprising a strap or cord for attachment to a user whereby the collection vessel is fully supported by said user.

* * * * *